US009206724B2

United States Patent
Hirota et al.

(10) Patent No.: US 9,206,724 B2
(45) Date of Patent: Dec. 8, 2015

(54) EXHAUST GAS PURIFICATION SYSTEM FOR INTERNAL COMBUSTION ENGINE

(75) Inventors: Shinya Hirota, Susono (JP); Akira Mikami, Susono (JP); Shunsuke Toshioka, Susono (JP); Kazuhiro Itoh, Mishima (JP); Koichiro Fukuda, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 428 days.

(21) Appl. No.: 13/640,231

(22) PCT Filed: Apr. 8, 2010

(86) PCT No.: PCT/JP2010/056390
§ 371 (c)(1),
(2), (4) Date: Nov. 6, 2012

(87) PCT Pub. No.: WO2011/125207
PCT Pub. Date: Oct. 13, 2011

(65) Prior Publication Data
US 2013/0058832 A1  Mar. 7, 2013

(51) Int. Cl.
| | |
|---|---|
| *F01N 3/10* | (2006.01) |
| *F01N 3/18* | (2006.01) |
| *B01D 53/94* | (2006.01) |
| *G05D 23/00* | (2006.01) |
| *F01N 3/20* | (2006.01) |
| *F01N 3/36* | (2006.01) |
| *F01N 3/38* | (2006.01) |
| *F01N 9/00* | (2006.01) |
| *F01N 3/025* | (2006.01) |

(52) U.S. Cl.
CPC ............ *F01N 3/2033* (2013.01); *F01N 3/0256* (2013.01); *F01N 3/36* (2013.01); *F01N 3/38* (2013.01); *F01N 9/00* (2013.01); *F01N 2240/14* (2013.01); *F01N 2340/02* (2013.01); *F01N 2900/1411* (2013.01); *F01N 2900/1602* (2013.01); *Y02T 10/26* (2013.01); *Y02T 10/47* (2013.01)

(58) Field of Classification Search
None
See application file for complete search history.

(56) References Cited

U.S. PATENT DOCUMENTS 4,955,183 A    9/1990  Kolodzie et al.

FOREIGN PATENT DOCUMENTS

| JP | A-2002-242661 | 8/2002 |
| JP | A-2004-92497 | 3/2004 |

(Continued)

OTHER PUBLICATIONS

Yohei et al. (JP2007-146700A) (2007) machine translation.*

*Primary Examiner* — Walter D Griffin
*Assistant Examiner* — Jelitza Perez
(74) *Attorney, Agent, or Firm* — Oliff PLC

(57) ABSTRACT

An exhaust gas purification system is equipped with a burner in an exhaust passage upstream of an exhaust gas purification apparatus and having a burner combustion chamber in which flame is produced. When the temperature of the exhaust gas purification apparatus is raised, the burner produces flame that extends from the interior of the burner combustion chamber to the interior of the exhaust passage when the flow rate of the exhaust gas is not higher than a predetermined flow rate, and the burner causes the size of the flame to be smaller than when it is determined that the flow rate of the exhaust gas is not higher than the predetermined flow rate or to produce flame only in the interior of the burner combustion chamber when it is determined that the flow rate of exhaust gas is higher than the predetermined flow rate.

6 Claims, 7 Drawing Sheets

(56) References Cited

FOREIGN PATENT DOCUMENTS

| | | |
|---|---|---|
| JP | A-2005-232975 | 9/2005 |
| JP | A-2005-307842 | 11/2005 |
| JP | A-2007-32398 | 2/2007 |
| JP | A-2007-146700 | 6/2007 |
| JP | A-2008-291760 | 12/2008 |
| WO | WO 2010026466 A1 * | 3/2010 |

* cited by examiner (a)

(b)

EXHAUST GAS PURIFICATION SYSTEM FOR INTERNAL COMBUSTION ENGINE

TECHNICAL FIELD

The present invention relates to an exhaust gas purification system for an internal combustion engine equipped with a burner used to raise the temperature of an exhaust gas purification apparatus.

BACKGROUND ART

There is a known technology in which a burner is provided in an exhaust passage of an internal combustion engine upstream of an exhaust gas purification apparatus including an exhaust gas purification catalyst and/or a particulate filter in order to raise the temperature of the exhaust gas purification apparatus (see, for example, Patent Documents 1 and 2). Such a burner has a burner combustion chamber, and fuel supplied into the burner combustion chamber is burned to raise the temperature of the exhaust gas flowing into the exhaust gas purification catalyst.

Patent Document 3 discloses a burner that can take in a portion of the exhaust gas diverted from the main stream of the exhaust gas and burn fuel. Moreover, Patent Document 3 describes the technique of arranging the burner in such a way that the emitted flame does not interfere directly with the main stream of the exhaust gas in order to achieve stable burning. Furthermore, Patent Document 3 describes the result of measurement of the stability of the flame in the case where the flame of the burner does not interfere directly with the mainstream of the exhaust gas and in the case where the flame interferes with the main stream of the exhaust gas. In the document, the measurement results are given for the idle state, high rotation speed operation state, and normal operation state respectively.

Patent Document 4 discloses a technology pertaining to a catalyst temperature raising apparatus having a pre-mixing space in which air and fuel are mixed to form air-fuel mixture and an ignition plug that ignites the air-fuel mixture formed in the pre-mixing space, in which a combustion catalyst is provided between the region in which the pre-mixing space and the ignition plug are disposed and the exhaust gas purification catalyst. Furthermore, Patent Document 4 describes a technique in which when the temperature of the exhaust gas purification catalyst does not need to be raised much, air and fuel are supplied without igniting the air-fuel mixture in the pre-mixing space.

PRIOR ART DOCUMENTS

Patent Documents

Patent Document 1: Japanese Patent Application Laid-Open No. 2005-232975
Patent Document 2: Japanese Patent Application Laid-Open No. 2004-092497
Patent Document 3: Japanese Patent Application Laid-Open No. 2007-146700
Patent Document 4: Japanese Patent Application Laid-Open No. 2007-032398
Patent Document 5: Japanese Patent Application Laid-Open No. 2002-242661

SUMMARY OF THE INVENTION

Problems to be Solved by the Invention

In the case where a burner is provided in the exhaust passage, the exhaust gas is heated by flame produced by the burner. However, when the flow rate of the exhaust gas increases, the formation of the flame may be affected by the exhaust gas to be made unstable in some cases. Instability of the flame of the burner leads to instability of the temperature and the HC concentration of the exhaust gas flowing into the exhaust gas purification apparatus, which may consequently cause a decrease in the exhaust gas purification capability of the exhaust gas purification apparatus. When the flow rate of the exhaust gas increases, there is a possibility that the flame may be affected by the exhaust gas to reach the exhaust gas purification apparatus. If the flame of the burner reaches the exhaust gas purification apparatus, there is a risk of accelerated deterioration of the exhaust gas purification apparatus and/or a risk of melting of the exhaust gas purification apparatus.

To stabilize the formation of the burner flame, a burner having a primary combustion chamber and a secondary combustion chamber as shown in FIG. 8 has been developed. In this type of burner, air-fuel mixture of secondary air supplied from the outside and fuel is formed in the primary combustion chamber. Then, the air-fuel mixture is ignited to burn fuel thereby forming flame. Furthermore, the exhaust gas is taken into the secondary combustion chamber, in which the air-fuel mixture and the exhaust gas are mixed so that the combustion is promoted by the oxygen in the exhaust gas.

The above-described construction of the burner having the primary combustion chamber and the secondary combustion chamber can stabilize the formation of the flame. However, this construction of the burner will make the structure of the burner complex and bulky, leading to a problem of low mountability of the burner on a vehicle.

The present invention has been made in view of the above-described problem, and its object is to provide a technology that enables improved heating of the exhaust gas purification apparatus without making the structure of the burner complex or bulky.

Means for Solving the Problems

In the present invention, at the time of raising the temperature of an exhaust gas purification apparatus, if the flow rate of the exhaust gas is equal to or lower than a predetermined flow rate, a burner is caused to produce flame that extends from the interior of a burner combustion chamber to the interior of an exhaust passage, and if it is determined that the flow rate of the exhaust gas is higher than the aforementioned predetermined flow rate, the burner is caused to produce flame only in the burner combustion chamber.

More specifically, an exhaust gas purification system for an internal combustion engine according to the present invention comprises:

an exhaust gas purification apparatus provided in an exhaust passage of the internal combustion engine;

a burner provided in the exhaust passage upstream of said exhaust gas purification apparatus and having a burner combustion chamber in which flame is produced, a secondary air supply part that supplies secondary air into the interior of said burner combustion chamber, a fuel injection part that injects fuel into the interior of said burner combustion chamber, and an ignition part that ignites a mixture of secondary air and fuel formed in said burner combustion chamber;

a determination unit that determines whether or not the flow rate of exhaust gas is equal to or lower than a predetermined flow rate; and a burner control unit that causes said burner to produce flame that extends from the interior of said burner combustion chamber to the interior of the exhaust passage upstream of said exhaust gas purification apparatus when it is determined by said determination unit that the flow rate of exhaust gas is equal to or lower than said predetermined flow rate and causes said burner to make the size of the flame produced in the interior of the exhaust passage smaller than when it is determined that the flow rate of exhaust gas is equal to or lower than said predetermined flow rate or to produce flame only in the interior of said burner combustion chamber when it is determined by said determination unit that the flow rate of exhaust gas is higher than said predetermined flow rate, at the time of raising the temperature of said exhaust gas purification apparatus.

The predetermined flow rate mentioned here is a threshold value of the flow rate of the exhaust gas at which even if flame is produced in the interior of the exhaust passage, the flame is little affected by the exhaust gas and thus produced stably.

According to the present invention, the burner can produce stable flame irrespective of the flow rate of the exhaust gas. Furthermore, when the flow rate of the exhaust gas is not higher than the predetermined flow rate, while the burner combustion chamber serves as a primary combustion chamber, the portion of the exhaust passage between the burner and the exhaust gas purification apparatus can serve as a secondary combustion chamber. Therefore, heating of the exhaust gas by the flame can be promoted as much as possible without the provision of an independent secondary chamber. Therefore, it is possible to raise the temperature of the exhaust gas purification apparatus more appropriately without making the structure of the burner complex or bulky.

In the system according to the present invention, the burner combustion chamber may be arranged in such a way as to extend into the interior of the exhaust passage, and the wall of the portion of the burner combustion chamber that extends into the interior of the exhaust passage may be adapted to allow infiltration of fuel.

Then, a portion of fuel injected into the interior of the burner combustion chamber infiltrates into the wall of the burner combustion chamber. In consequence, the portion of fuel hardly contributes to the formation of the flame. Consequently, excessive growth of the flame can be prevented. The fuel infiltrating into the wall of the burner combustion chamber is emitted into the exhaust gas in a vaporized state and supplied to the exhaust gas purification apparatus. In the case where the exhaust gas purification apparatus includes a catalyst having an oxidizing function, the fuel thus supplied is oxidized in the catalyst to contribute to a rise in the temperature of the exhaust gas purification apparatus.

When it is determined by the determination unit that the flow rate of exhaust gas is higher than the aforementioned predetermined flow rate at the time of raising the temperature of the exhaust gas purification apparatus, the burner control unit may cause the fuel injection part to perform fuel injection continuously at an injection rate equal to or lower than a predetermined injection rate and to interlace intermittently performed fuel injection at an injection rate higher than the aforementioned predetermined injection rate. In this context, the injection rate refers to the quantity of injected fuel per unit time while the fuel injection is performed. The higher the injection rate is, the stronger the penetration force of injected fuel is.

The predetermined injection rate is a threshold value of the injection rate at which the fuel injected by the fuel injection part stays within the burner combustion chamber. Therefore, if fuel injection is performed at an injection rate higher than the predetermined injection rate, a large part of injected fuel will be emitted to the exhaust gas without contributing to the formation of flame.

The formation of flame in the burner combustion chamber can be maintained by performing continuous fuel injection at an injection rate not higher than the predetermined injection rate. In addition, by interlacing intermittently performed fuel injection at an injection rate higher than the predetermined injection rate, excessive growth of flame can be suppressed. Thus, by controlling the fuel injection by the fuel injection part in the above-described manner, the size of the flame produced in the interior of the exhaust passage can be controlled, or the flame can be produced only in the burner combustion chamber.

When the internal combustion engine is in an idle operation state or a decelerating operation state, the flow rate of the exhaust gas decreases. Therefore, said determination unit may determine that the flow rate of the exhaust gas is equal to or lower than said predetermined flow rate when the internal combustion engine is in an idle operation state or a decelerating operation state.

The exhaust gas purification apparatus may include a catalyst having an oxidizing function. Then, the portion of the fuel injected through the fuel injection part of the burner that is delivered to the exhaust gas purification apparatus without being burned is oxidized by the catalyst. The temperature of the exhaust gas purification apparatus can be raised by the oxidation heat generated thereby.

Advantageous Effect of the Invention

According to the present invention, stable flame can be produced without making the structure of the burner complex or bulky, and heating of the exhaust gas by the flame can be promoted as much a possible. In consequence, the temperature of the exhaust gas purification apparatus can be raised in an improved manner.

BRIEF DESCRIPTION OF THE DRAWINGS

FIG. 3(a) shows the state in a case where the flow rate of the exhaust gas is not higher than a predetermined flow rate, and FIG. 3(b) shows the state in a case where the flow rate of the exhaust gas is higher than the predetermined flow rate.

EMBODIMENTS FOR CARRYING OUT THE INVENTION

In the following, specific embodiments of the present invention will be described with reference to the drawings.

The dimensions, materials, shapes, relative arrangements, and other features of the components that will be described in connection with the embodiments are not intended to limit the technical scope of the present invention only to them, unless particularly stated.

Embodiment

Here, a case in which the present invention is applied to an exhaust gas purification system of a diesel engine for driving a vehicle will be described. However, the internal combustion engine to which the present invention is applied is not limited to a diesel engine, but it may be a gasoline engine.
(General Configuration of Air-Intake and Exhaust System of Internal Combustion Engine)

Figure 1:
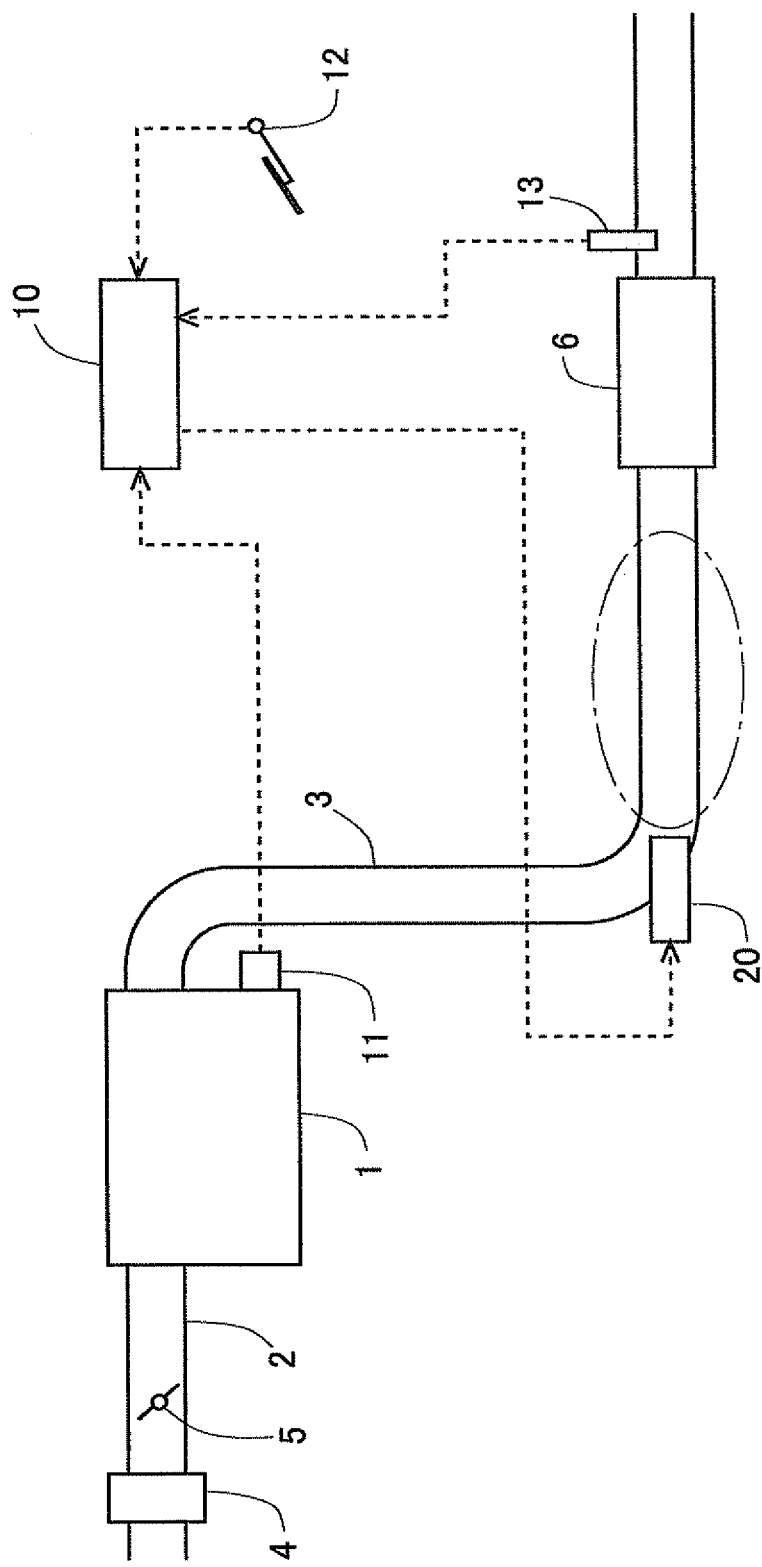
FIG. 1 is a diagram showing the general construction of an air-intake and exhaust system of an internal combustion engine according to an embodiment.

FIG. 1 is a diagram showing the general configuration of an air-intake and exhaust system of an internal combustion engine according to the embodiment. The internal combustion engine 1 is a diesel engine for driving a vehicle. An intake passage 2 and an exhaust passage 3 are connected to the internal combustion engine 1.

An air flow meter 4 and a throttle valve 5 are provided in the intake passage 2. The air flow meter 4 measures the intake air quantity of the internal combustion engine 1. The throttle valve 5 changes the cross sectional area of the flow channel of the intake passage 2 to regulate the flow rate of the intake air flowing in the intake passage 2.

An exhaust gas purification catalyst 6 is provided in the exhaust passage 3. The exhaust gas purification catalyst 6 has an oxidizing function. Examples of the exhaust gas purification catalyst 6 include an oxidation catalyst, an NOx storage reduction catalyst, and an NOx selective reduction catalyst. The exhaust gas purification catalyst 6 may be made up of a plurality of catalysts having different functions.

In this embodiment, the exhaust gas purification catalyst 6 corresponds to the exhaust gas purification apparatus according to the present invention. The exhaust gas purification apparatus according to the present invention is not limited to a catalyst, but it may be, for example, a particulate filter. Alternatively, the exhaust gas purification apparatus according to the present invention may include a catalyst and a particulate filter in combination. For instance, an oxidation catalyst, a particulate filter, and an NOx storage reduction catalyst (or an NOx selective reduction catalyst) may be arranged in order from upstream to constitute the exhaust gas purification apparatus according to the present invention.

A burner 20 for heating the exhaust gas to raise the temperature of the exhaust gas purification catalyst 6 is provided in the exhaust passage 3 upstream of the exhaust gas purification catalyst 6. The construction of the burner 20 will be described later. A temperature sensor 13 that measures the temperature of the exhaust gas is provided in the exhaust passage 3 downstream of the exhaust gas purification catalyst 6.

An electronic control unit (ECU) 10 that controls the internal combustion engine 1 is annexed to the internal combustion engine 1. The ECU 10 is electrically connected with the air flow meter 4 and the temperature sensor 13. The ECU 10 is also electrically connected with a crank position sensor 11 of the internal combustion engine 1 and an accelerator opening degree sensor 12 of the vehicle on which the internal combustion engine 1 is mounted. Signals output from the sensors are input to the ECU 10.

The ECU 10 can derive the engine speed of the internal combustion engine 1 based on the output signal of the crank position sensor 11. The ECU 10 can also derive the engine load of the internal combustion engine 1 based on the output signal of the accelerator opening degree sensor 12. Moreover, the ECU 10 can derive the temperature of the exhaust gas purification catalyst 6 based on the output signal of the temperature senor 13.

The ECU 10 is electrically connected with the throttle valve 5 and the burner 20. The operation of these components are controlled by the ECU 10.
(General Construction of Burner)

Figure 2:
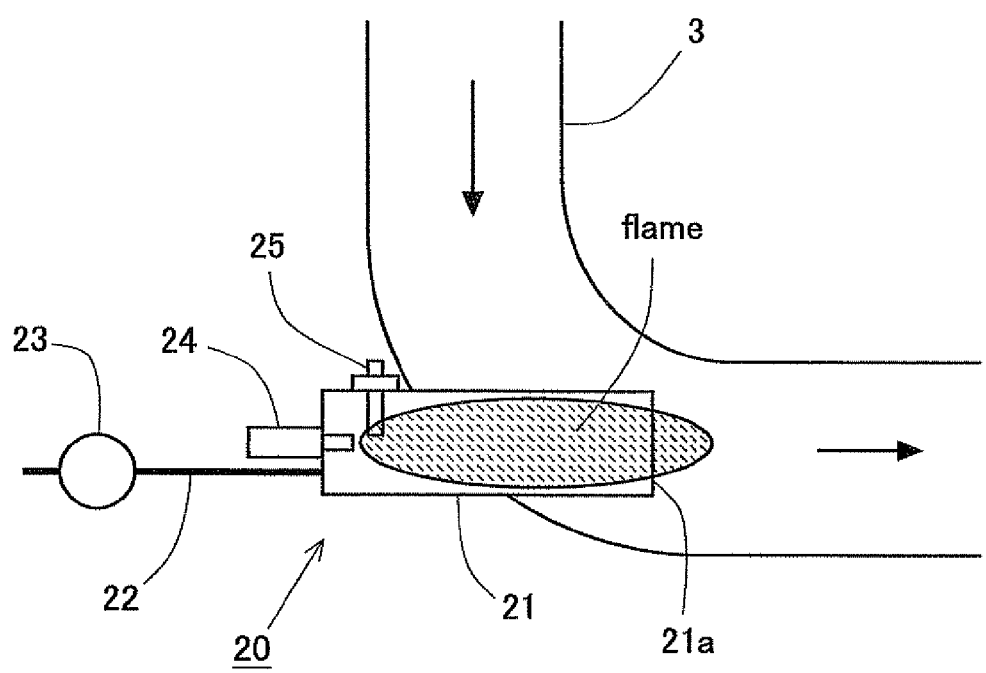
FIG. 2 is a first diagram showing the general construction of a burner according to the embodiment.

FIG. 2 shows the general construction of the burner 20. The burner 20 has a burner combustion chamber 21, an air supply passage 22, an air pump 23, a fuel injection valve 24, and an ignition plug 25. The arrows in FIG. 2 indicate the flow of the exhaust gas in the exhaust passage 3.

As shown in FIG. 2, the burner combustion chamber 21 is arranged in such a way as to partly extend into the interior of the exhaust passage 3. The end 21a of the portion of the burner combustion chamber 21 that extends into the interior of the exhaust passage 3 is open. The air supply passage 22 is connected to the burner combustion chamber 21. Secondary air is supplied into the burner combustion chamber 21 through the air supply passage 22. The secondary air refers to air supplied into the burner combustion chamber 21 differently from the exhaust gas. The air pump 23 is provided in the air supply passage 22. The air pump 23 is adapted to pump air to the burner combustion chamber 21.

The fuel injection valve 24 injects fuel into the burner combustion chamber 21. In the interior of the burner combustion chamber 21, secondary air supplied through the air supply passage 22 and fuel injected through the fuel injection valve 24 are mixed to form air-fuel mixture. The ignition plug 25 ignites the air-fuel mixture formed in the burner combustion chamber 21. Thus, fuel is burned to produce flame. The exhaust gas is heated by the heat of the flame.

As described above, the end 21a of the burner combustion chamber 21 is open. Therefore, as the flame produced in the burner combustion chamber 21 grows larger, it will extend into the interior of the exhaust passage 3.
(Burner Control)

Here, burner control in raising the temperature of the exhaust gas purification catalyst according to this embodiment will be described. In this embodiment, when it is necessary to raise the temperature of the exhaust gas purification catalyst 6, as is the case when the temperature of the exhaust gas purification catalyst 6 is lower than the active temperature, the burner 20 is actuated. As the burner 20 is actuated, it produces flame, which heat the exhaust gas in the region upstream of the exhaust gas purification catalyst 6. The exhaust gas thus heated flows into the exhaust gas purification catalyst 6 to raise the temperature of the exhaust gas purification catalyst 6.

While the burner 20 is operating, if the flame produced in the burner combustion chamber 21 grows larger and extends beyond the end 21a of the burner combustion chamber 21 into the interior of the exhaust passage 3, oxygen in the exhaust gas flowing in the exhaust passage 3 is used in the combustion of fuel. In this situation, while the burner combustion chamber 21 serves as the primary combustion chamber, a portion of the exhaust passage 3 between the burner 20 and the exhaust gas purification catalyst 6 (i.e. the portion encircled by the dot-and-dash line in FIG. 1) serves as the secondary combustion chamber. In consequence, the combustion of fuel is promoted. Therefore, if flame extending into the interior of the exhaust passage 3 is produced when the flow rate of the exhaust gas flowing in the exhaust passage 3 is relatively low, the flame can be produced more stably and heating of the exhaust gas by the flame can be promoted.

However, if flame extending into the interior of the exhaust passage 3 is produced when the flow rate of the exhaust gas flowing in the exhaust passage 3 is relatively high, the formation of flame may be affected by the exhaust gas to be made rather unstable, in some cases. Specifically, there is a possibility that misfire or excessive growth of flame may occur. In view of this, in this embodiment the way of producing flame by the burner 20 to raise the temperature of the exhaust gas purification catalyst 6 is changed depending on the flow rate of the exhaust gas flowing in the exhaust passage 3.

Figure 3:
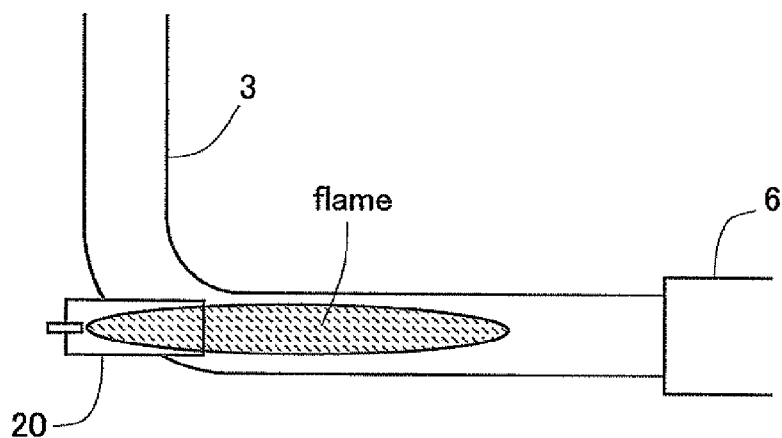
FIG. 3 includes diagrams showing states of flame of the burner during the execution of a temperature raising control for an exhaust gas purification catalyst according to the embodiment, where
Figure 3:
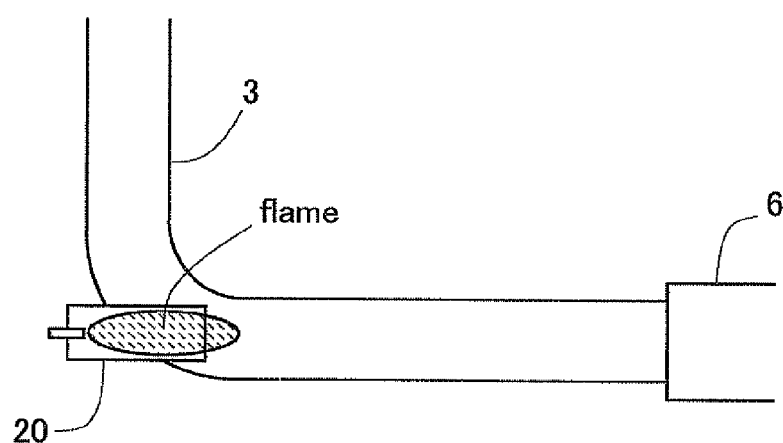

FIG. 3 illustrates the state of the flame of the burner 20 at a time when the temperature raising control for the exhaust gas purification catalyst according to this embodiment is performed. FIG. 3(a) illustrates the state of the flame in a case where the flow rate of the exhaust gas is not higher than a predetermined flow rate. FIG. 3(b) illustrates the state of the flame in a case where the flow rate of the exhaust gas is higher than the predetermined flow rate. The predetermined flow rate mentioned here is a threshold value of the exhaust gas flow rate at which even if flame is produced in the interior of the exhaust passage 3, the flame is little affected by the exhaust gas and produced stably. The predetermined flow rate as such can be determined in advance based on, for example, an experiment. Thus, when the flow rate of the exhaust gas is not higher than the predetermined flow rate, the burner 20 is controlled to produce flame extending from the interior of the burner combustion chamber 21 into the interior of the exhaust passage 3 as shown in FIG. 3(a). On the other hand, when the flow rate of the exhaust gas is higher than the predetermined flow rate, the burner 20 is controlled, as shown in FIG. 3(b), in such a way that the flame produced in the exhaust passage 3 is smaller than that in the case where the flow rate of the exhaust gas is not higher than the predetermined flow rate or that the flame is produced only in the burner combustion chamber 21.

By the above-described control, stable flame can be produced by the burner 20 irrespective of the flow rate of the exhaust gas. Furthermore, when the flow rate of the exhaust gas is not higher than the predetermined flow rate, the portion of the exhaust passage between the burner and the exhaust gas purification apparatus serves as the secondary combustion chamber, so that heating of the exhaust gas by the flame can be promoted as much as possible without providing an independent secondary chamber. Therefore, the burner control of this embodiment enables to raise the temperature of the exhaust gas purification catalyst 6 more appropriately without making the structure of the burner 20 complex or bulky.

(Control Process)

Figure 4:
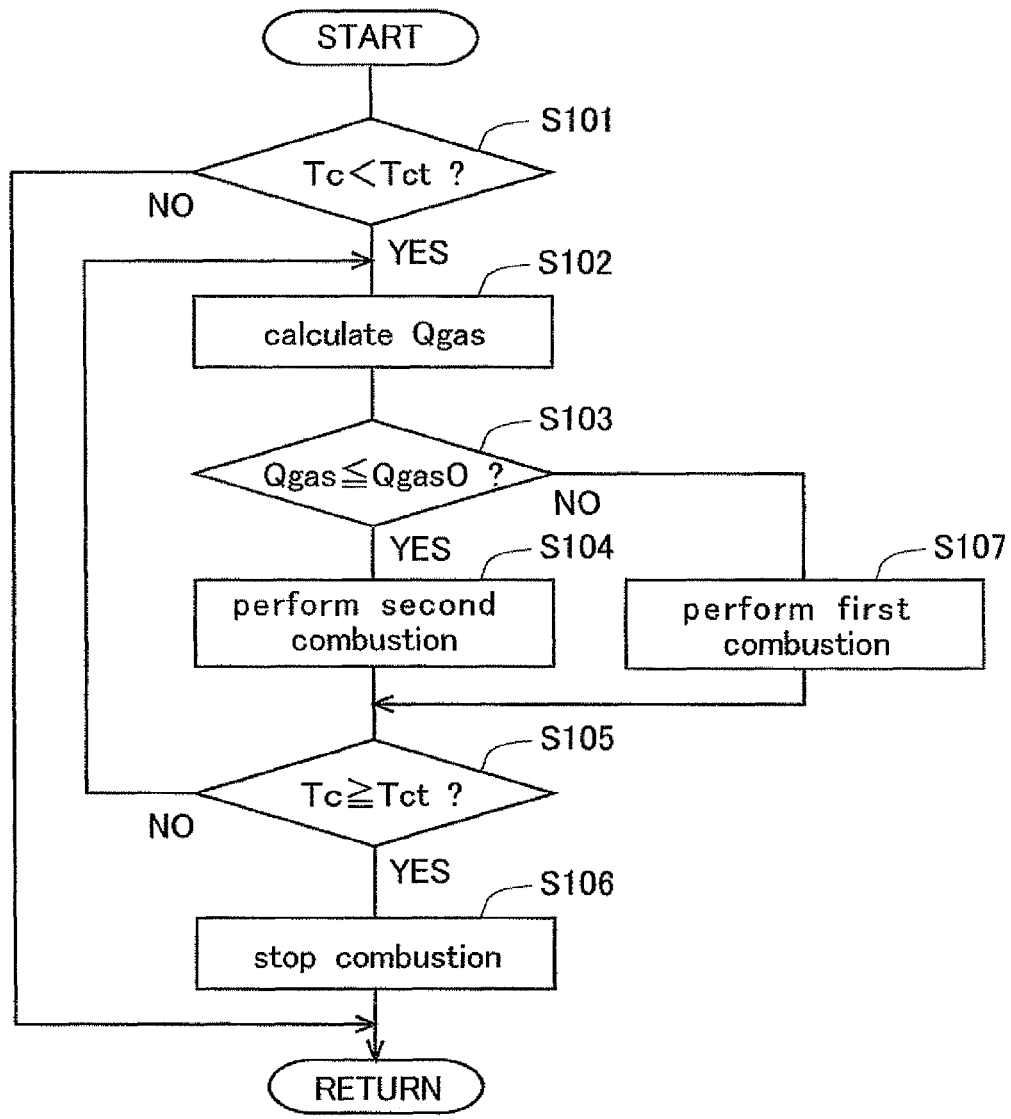
FIG. 4 is a flow chart of a process of the temperature raising control for the exhaust gas purification catalyst according to the embodiment.

In the following, the process of temperature raising control for the exhaust gas purification catalyst according to this embodiment will be described with reference to the flow chart in FIG. 4. This process is stored in the ECU 10 in advance and executed repeatedly by the ECU 20 during the operation of the internal combustion engine 1.

In this process, firstly in step S101, it is determined whether or not the temperature Tc of the exhaust gas purification catalyst 6 derived based on the measurement value of the temperature sensor 13 is lower than a target temperature Tct. The target temperature Tct is a value that is set in advance according to the purpose of raising the temperature of the exhaust gas purification catalyst. The target temperature Tct may be, for example, the lowest active temperature or the temperature that maximizes the exhaust gas purification rate.

If it is determined in step S101 that the temperature Tc of the exhaust gas purification catalyst 6 is lower than the target temperature Tct, the processing in step S102 is executed next. In step S102, the flow rate Qgas of the exhaust gas flowing in the exhaust passage 3 is calculated based on, for example, the measurement value of the air flow meter 4. Then, in step S103, it is determined whether or not the flow rate Qgas of the exhaust gas is equal to or lower than a predetermined flow rate Qgas0. The predetermined flow rate Qgas0 is a value determined, for example, based on an experiment and stored in advance in the ECU 10.

The flow rate of the exhaust gas is much lower when the internal combustion engine is in an idle operation state or decelerating operation state than when it is in a normal operation state. Therefore, in this embodiment, determination as to whether or not the flow rate Qgas of the exhaust gas is equal to or lower than the predetermined flow rate Qgas0 may be made based on the operation state of the internal combustion engine 1. Specifically, when the internal combustion engine 1 is in an idle operation state or decelerating operation state, it may be determined that the flow rate Qgas of the exhaust gas is equal to or lower than the predetermined flow rate Qgas0.

If it is determined in step S103 that the flow rate Qgas of the exhaust gas is equal to or lower than the predetermined flow rate Qgas0, the processing in step S104 is executed next. On the other hand, if it is determined in step S103 that the flow rate Qgas of the exhaust gas is higher than the predetermined flow rate Qgas0, the processing in step S107 is executed next. In step S104, second combustion is performed in the burner 20. In step S107, first combustion is performed in the burner 20.

The second combustion mentioned above refers to combustion in which flame extending from the interior of the burner combustion chamber 21 into the interior of the exhaust passage 3 is produced. The first combustion refers to combustion in which flame is produced only inside the burner combustion chamber 21 or combustion in which flame produced also in the interior of the exhaust passage 3 is smaller in size than that in the case of the first combustion. The above-described combustions performed in the burner 20 will heat the exhaust gas to cause a rise in the temperature of the exhaust gas purification catalyst 6.

After the execution of the processing in step S104 or S107, it is determined next in step S105 whether or not the temperature Tc of the exhaust gas purification catalyst 6 has become equal to or higher than the target temperature Tct. If it is determined in step S107 that the temperature Tc of the exhaust gas purification catalyst 6 has not reached the target temperature Tct yet, the processing in step S102 is executed again. On the other hand, if it is determined in step S107 that the temperature Tc of the exhaust gas purification catalyst 6 has reached the target temperature Tct, the processing in step S106 is executed next. In step S106, the combustion in the burner 20 is stopped, namely the operation of the burner 20 is terminated.

In this embodiment, the ECU 10 that executes the processing in step S103 of the above-described process corresponds to the determination unit according to the present invention. Furthermore, the ECU 10 that executes the processing of steps S104 and S107 in the above-described process corresponds to the burner control unit according to the present invention.

(Implementation Methods of First and Second Combustion)

Specific implementation methods of the first and second combustion by the burner 20 will be described. The implementation methods described below are illustrative methods, and the implementation methods of the first and second combustion are not limited to them.

In the fuel injection by the fuel injection valve 24, the higher the injection rate is, the stronger the penetration force of injected fuel is. Therefore, the higher the injection rate in the fuel injection is, the more the injected fuel is apt to extend beyond the end 21a of the burner combustion chamber 21 into the interior of the exhaust passage 3 without being burned. In this connection, the threshold value of the injection rate at which the fuel injected by the fuel injection valve 24 stays within the burner combustion chamber 21 will be referred to as the predetermined injection rate.

In this embodiment, the second combustion is implemented by continuously performing fuel injection by the fuel injection valve 24 at an injection rate equal to or lower than the predetermined injection rate. A large part of fuel injected into the burner combustion chamber 21 by the fuel injection performed at an injection rate not higher than the predetermined injection rate is burned in the burner combustion chamber 21 to contribute to the formation of flame. Continuous fuel injection performed at an injection rate not higher than the predetermined injection rate promotes the growth of flame. Consequently, flame extending into the interior of the exhaust passage 3 is produced.

On the other hand, the first combustion is implemented by continuously performing fuel injection by the fuel injection valve 24 at an injection rate not higher than the predetermined injection rate and interlacing intermittently performed fuel injection by the fuel injection valve 24 at an injection rate higher than the predetermined injection rate. The flame in the burner combustion chamber 21 is maintained by continuous fuel injection performed at an injection rate not higher than the predetermined injection rate. On the other hand, a large part of fuel injected by fuel injection performed at an injection rate higher than the predetermined injection rate is emitted to the exhaust gas without contributing to the formation of flame. Therefore, the excessive growth of flame is suppressed by interlacing intermittently performed fuel injection at an injection rate higher than the predetermined injection rate. In consequence, flame is produced only in the interior of the burner combustion chamber 21. Alternatively, even if flame is produced in the exhaust passage 3, its size will be smaller than that in the case of the second combustion.

The fuel emitted into the exhaust gas without contributing to the formation of flame is supplied to the exhaust gas purification catalyst 6. Then, the fuel is oxidized in the exhaust gas purification catalyst 6 to contribute to a rise in the temperature of the exhaust gas purification catalyst 6.

In this embodiment, the area of the opening at the end 21a of the burner combustion chamber 21 may be much smaller than the cross sectional area of the exhaust passage 3 with respect to the direction perpendicular to the direction of flow of the exhaust gas. Then, an increase in the flow rate of the exhaust gas flowing in the exhaust passage 3 will make it harder for the flame produced in the interior of the burner combustion chamber 21 to extend beyond the end 21a into the interior of the exhaust passage 3. This facilitates the implementation of the first combustion.

When further raising the temperature of the exhaust gas purification catalyst 6 to the target temperature after the exhaust gas purification catalyst 6 has become active, there may be a case where the flow rate of the exhaust gas is higher than the predetermined flow rate and it is difficult to raise the temperature of the exhaust gas purification catalyst 6 by the first combustion sufficiently. In such a case, the burner 20 may be adapted to supply fuel reformed in the burner combustion chamber 21 to the exhaust gas purification catalyst 6. The fuel supplied to the exhaust gas purification catalyst 6 in this way is also oxidized in the exhaust gas purification catalyst 6 to contribute to a rise in the temperature of the exhaust gas purification catalyst 6. Consequently, the temperature of the exhaust gas purification catalyst 6 can be raised to the target temperature more quickly.

(Construction of Burner Combustion Chamber)

Figure 5:
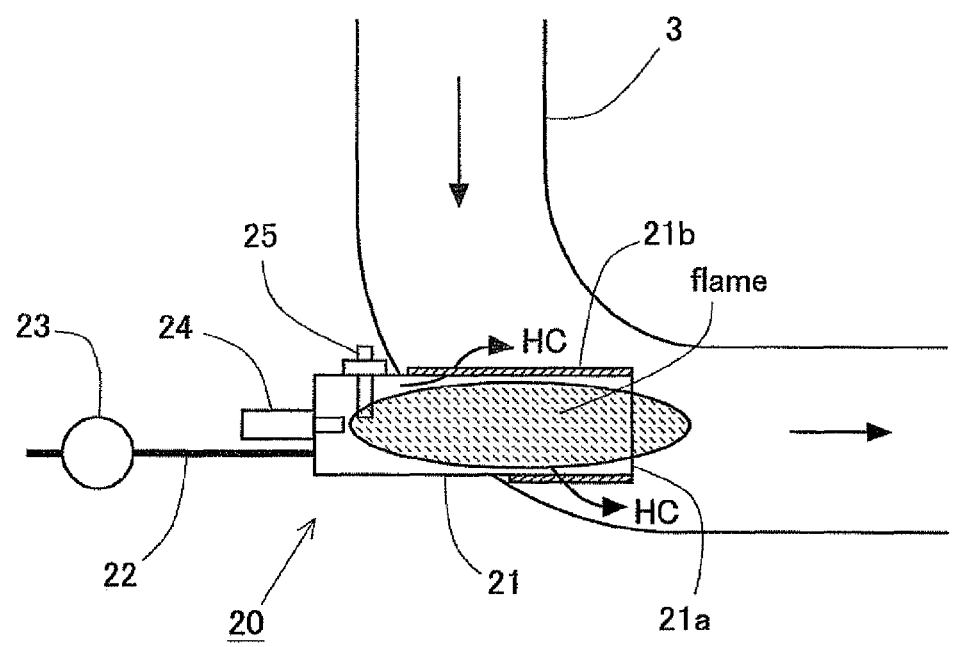
FIG. 5 is a second diagram showing the general construction of the burner according to the embodiment.

In this embodiment, the burner 20 is arranged in such a way that the burner combustion chamber 21 extends into the interior of the exhaust passage 3, as described above. The wall 21b of the portion of the burner combustion chamber 21 that extends into the interior of the exhaust passage 3 may allow the infiltration of fuel as shown in FIG. 5. In this case, the wall 21b is made of a porous member. For example, the wall 21b may be made of a sintered material. This allows the infiltration of fuel into the wall. Alternatively, the wall 21b may be made of a meshed member, punched metal or the like.

As described above, when performing the first combustion by the burner 20, it is necessary to suppress the growth of the flame while maintaining the formation of flame. However, since the flow rate of the exhaust gas in the exhaust passage 3 is high when the first combustion is performed, there may be cases where it is necessary to increase the quantity of fuel injected through the fuel injection valve 24 in order to raise the temperature of the exhaust gas purification catalyst 6 sufficiently. Then, there is a possibility that the growth of the flame is promoted.

In such cases, if the wall 21b of the burner combustion chamber 21 is adapted to allow the infiltration of fuel, a portion of the fuel injected into the interior of the burner combustion chamber 21 infiltrates into the wall 21b. Then, the part of fuel hardly contributes to the formation of the flame. Consequently, excessive growth of the flame can be prevented.

The fuel infiltrating into the wall 21b of the burner combustion chamber 21 is emitted into the exhaust gas in a vaporized state and supplied to the exhaust gas purification catalyst 6. The fuel supplied to the exhaust gas purification catalyst 6 in this way is also oxidized in the exhaust gas purification catalyst 6 to contribute to a rise in the temperature of the exhaust gas purification catalyst 6. In the case where the exhaust gas purification catalyst 6 includes an NOx selective reduction catalyst in which fuel serves as reducing agent, the exhaust gas infiltrating into the wall 21b and emitted into the exhaust gas is used as reducing agent.

(Temperature Rise Effect by Second Combustion)

Figure 6:
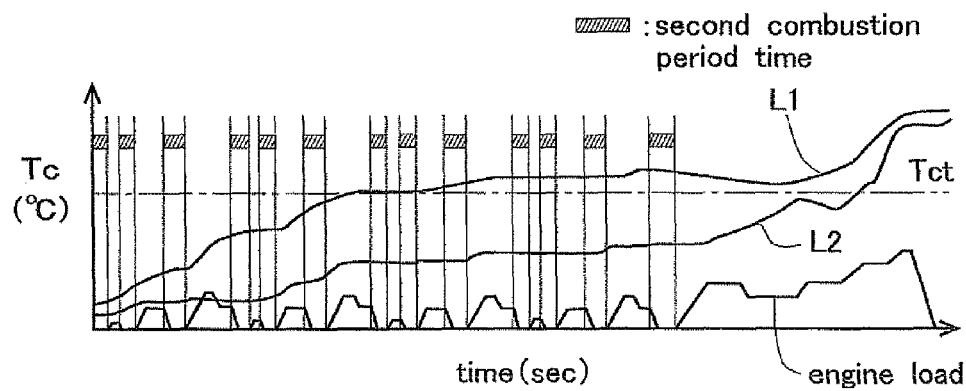
FIG. 6 is a graph showing the change in the temperature of an NOx selective reduction catalyst with time while the temperature of the catalyst is raised.
Figure 7:
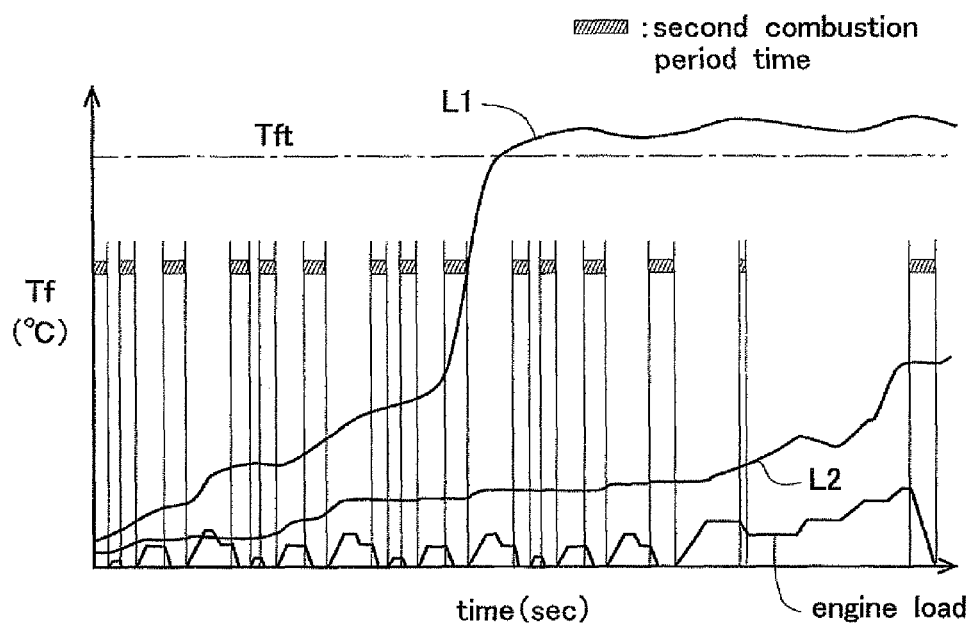
FIG. 7 is a graph showing the change in the temperature of a particular filter with time while the temperature of the particulate filter is raised.
Figure 8:
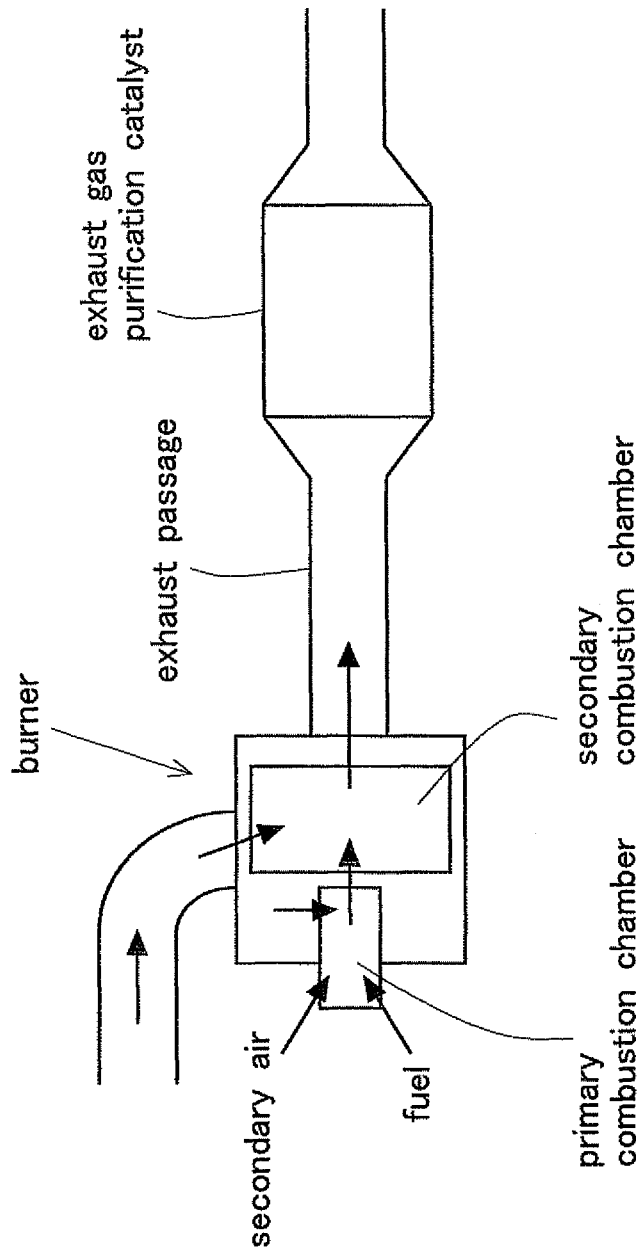
FIG. 8 is a diagram showing the general construction of a conventional burner.

Here, a temperature rise effect in the case where the second combustion by the burner 20 is performed will be described with reference to FIGS. 6 and 7. FIG. 6 shows the change in the temperature of the catalyst with time in a case where an NOx selective reduction catalyst is used as the exhaust gas purification catalyst 6. In this case, the second combustion by the burner 20 is performed in order to raise the temperature Tc of the NOx selective reduction catalyst to a target temperature Tct at which it can reduce NOx (e.g. a temperature at which the addition of aqueous solution of urea for urea supply is allowed) and to maintain the temperature equal to or higher than the target temperature Tct. FIG. 7 shows the change in the temperature Tf of a particulate filter with time in a case where the exhaust gas purification catalyst 6 is an oxidation catalyst and the particulate filter is provided. In this case, the second combustion by the burner 20 is performed in order to raise the temperature Tf of the particulate filter to a target temperature Tft at which particulate matter can be oxidized and to maintain the temperature equal to or higher than the target temperature Tft when removing particulate matter depositing on the particular filter.

In FIGS. 6 and 7, curves L1 represent a case in which the second combustion is performed by the burner 20 while the internal combustion engine 1 is in an idle operation state or a decelerating operation state, and curves L2 represent a case in which the burner 20 is not in operation.

As will be seen from FIGS. 6 and 7, by performing the second combustion by the burner 20, it is possible to raise the temperature of the exhaust gas purification catalyst or the particulate filter to the target temperature in a shorter time and to maintain the temperature.

DESCRIPTION OF THE REFERENCE SIGNS

1: internal combustion engine
2: intake passage
3: exhaust passage
4: air flow meter
6: exhaust gas purification catalyst
10: ECU
11: crank position sensor
12: accelerator opening degree sensor
13: temperature sensor
20: burner
21: burner combustion chamber
22: air supply passage
23: air pump
24: fuel injection valve
25: ignition plug

The invention claimed is:

1. An exhaust gas purification system for an internal combustion engine, the exhaust gas purification system comprising:
    an exhaust gas purification apparatus provided in an exhaust passage of the internal combustion engine;
    a burner provided in the exhaust passage upstream of said exhaust gas purification apparatus and having a burner combustion chamber in which flame is produced, an air pump that pumps secondary air into an interior of said burner combustion chamber, a fuel injector that injects fuel into the interior of said burner combustion chamber, and an igniter that ignites a mixture of secondary air and fuel formed in said burner combustion chamber; and
    controller that determines whether or not a flow rate of exhaust gas is equal to or less than a predetermined flow rate,
    wherein, at a time of raising a temperature of said exhaust gas purification apparatus, (i) when it is determined by said controller that the flow rate of exhaust gas is equal to or less than said predetermined flow rate, the controller causes said burner to produce a flame that extends from the interior of said burner combustion chamber to an interior of the exhaust passage upstream of said exhaust gas purification apparatus, and (ii) when it is determined by said controller that the flow rate of exhaust gas is higher than said predetermined flow rate, the controller causes said burner to make a size of the flame produced in the interior of the exhaust passage smaller than when it is determined that the flow rate of exhaust gas is equal to or less than said predetermined flow rate or to produce the flame only in the interior of said burner combustion chamber.

2. The exhaust gas purification system according to claim 1, wherein said burner combustion chamber is arranged in such a way as to extend into the interior of the exhaust passage, and a wall of the portion of said burner combustion chamber that extends into the interior of the exhaust passage allows infiltration of fuel.

3. The exhaust gas purification system according to claim 1, wherein when it is determined by said controller that the flow rate of exhaust gas is higher than said predetermined flow rate at the time of raising the temperature of said exhaust gas purification apparatus, said controller causes said fuel injector to perform fuel injection continuously at an injection rate equal to or lower than a predetermined injection rate and to interlace intermittently performed fuel injection at an injection rate higher than said predetermined injection rate.

4. The exhaust gas purification system according to claim 2, wherein when it is determined by said controller that the flow rate of exhaust gas is higher than said predetermined flow rate at the time of raising the temperature of said exhaust gas purification apparatus, said controller causes said fuel injector to perform fuel injection continuously at an injection rate equal to or lower than a predetermined injection rate and to interlace intermittently performed fuel injection at an injection rate higher than said predetermined injection rate.

5. The exhaust gas purification system according to claim 1, wherein said controller determines that the flow rate of exhaust gas is equal to or lower than said predetermined flow rate when said internal combustion engine is in an idle operation state or a decelerating operation state.

6. The exhaust gas purification system according to claim 1, wherein said exhaust gas purification apparatus includes a catalyst having an oxidizing function.

* * * * *